United States Patent [19]

Rose

[11] Patent Number: 5,774,087
[45] Date of Patent: Jun. 30, 1998

[54] APPARATUS FOR MEASURING MOVING EMITTER ELEVATION AND AZIMUTH DIRECTION FROM DOPPLER CHANGE MEASUREMENTS

[75] Inventor: Conrad M. Rose, Dahlgren, Va.

[73] Assignee: Litton Systems Inc., Woodland Hills, Calif.

[21] Appl. No.: 800,561

[22] Filed: Feb. 20, 1997

[51] Int. Cl.[6] ............................. G01S 13/06; G01S 13/72; G01S 3/04
[52] U.S. Cl. ............................. 342/13; 342/78; 342/113; 342/140; 342/158; 342/417; 342/418; 342/425
[58] Field of Search .................................. 342/13, 78, 95, 342/96, 97, 113, 115, 140, 158, 162, 195, 417, 418, 425

[56] References Cited

U.S. PATENT DOCUMENTS

| | | | |
|---|---|---|---|
| 5,343,212 | 8/1994 | Rose et al. | 342/424 |
| 5,444,451 | 8/1995 | Johnson et al. | 342/453 |
| 5,526,001 | 6/1996 | Rose et al. | 342/442 |
| 5,689,274 | 11/1997 | Rose | 342/417 |

*Primary Examiner*—John B. Sotomayor
*Attorney, Agent, or Firm*—Gerald L. Lett; Scott J. Coonan

[57] ABSTRACT

An electrical surveillance measures system for measuring direction of arrival (DOA), i.e., both azimuth and elevation, of a pulsed or continuous wave radar signal from a moving emitter. Either carrier frequency or pulse repetition interval (PARI) Doppler shift are used whereby the ratio of the Doppler shift is measured by a moving observer. The DOA is measured as a unit vector having basis vectors formed from a linearly independent set of observer's velocity vectors. The DOA unit vector has a linear part where the coefficients of the basis vectors are derived directly from the ratios of frequency or PARI measurements taken in three contiguous dwells. The DOA unit vector has a nonlinear part formed from the requirement that the DOA vector have unit magnitude. The unit vector is resolved in the system coordinates in which emitter azimuth and elevation are defined to allow computation of the latter two values.

4 Claims, 5 Drawing Sheets

APPARATUS FOR MEASURING MOVING EMITTER ELEVATION AND AZIMUTH DIRECTION FROM DOPPLER CHANGE MEASUREMENTS

BACKGROUND OF THE INVENTION

1. Field of Invention

This invention relates to electronic surveillance measures (ESM) systems for the location in azimuth and elevation of possibly moving pulsed or constant wave (CW) radars from a moving observer. More particularly, it relates to such a system which utilizes either pulse repetition interval (PRI) or carrier frequency to measure signal direction of arrival (DOA).

2. Description of Prior Art

Obtaining the direction-of-arrival to an emitter is an important electronic surveillance measures (ESM) system requirement. Typically, the DOA is used to help with situation awareness, signal sorting in a high emitter density environment, cuing other sensors, or for self defense against airborne threats. It is also needed for some passive emitter location methods, e.g. in providing the initial angle reference required to implement the air-to-ground location technique described in commonly assigned U.S. Pat. No. 5,343, 212 or the air-to-air ranging method described in the commonly assigned patent application "Method and Apparatus for Using Signal Doppler Change to Resolve Long Baseline Interferometer Ambiguous Phase Change Measurements", Ser. No. 08/693,546.

In the above applications DOA is needed because the emitter must be precisely located in azimuth. The azimuth measurement requirement cannot be met by generating angle-of-arrival (AOA) rather than DOA (See FIG. 1 below). Using AOA is severely limiting since AOA alone only defines a cone (10, FIG. 1*a*) on which the emitter signal DOA unit vector 11 may lie. The emitter is then ambiguous in both azimuth and elevation. This is seen by noting the relation between AOA (characterized by the single angle aoa 1, FIG. 1*a*) and DOA (characterized by the two angles az 6 and el 8 FIG. 1*b*), this relationship for the North-East-Down (NED)coordinate system 8 (in the special case of observer velocity 4 (FIG. 1*a*) and North or x-axis coincident) being $$\cos(aoa) = \cos(az)\cos(el) \quad (1)$$

where aoa=angle between the signal wave front normal and observer velocity vector, az=azimuth in local North-East-Down (NED) coordinates, el=elevation in NED.

As indicated in FIG. 1*a*, the intersection 3 of the AOA cone 10 (geometrically equivalent to Equation 1) with the earth is a conic section whose axis is the velocity vector 4 of the observer 5. In the case illustrated the conic section is a hyperbola, and the emitter 2, characterized only by AOA, may lie anywhere on the hyperbola. This can create a large error, called the coning error, if AOA is used for emitter azimuth. For example, from Equation 1, if the emitter has an azimuth of 45° with an elevation of 45°, the emitter AOA is 60°, i.e. using AOA in place of true azimuth gives an error of 15°.

A conventional approach to the problem of avoiding this coning error is the planar phase interferometer. The planar interferometer, e.g. that described by Eggert et al U.S. Pat. No. 4,638,320 requires an array of several antennas to resolve the signal direction-of-arrival phase measurement ambiguity. Retrofitting such an array on smaller aircraft, such as fighters, can be a difficult problem. Thus it is desirable to have a DOA solution that uses only one or two existing antennas, in particular those associated with the aircraft radar warning receiver (RWR) since these typically respond to signals in the frequency range of interest. A two antenna solution that may utilize RWR antennas is given in the commonly assigned U.S. patent application "Measuring Emitter Direction of Arrival Angle Using Squinted Antennas", Ser. No. 08/480,906. A single antenna DOA solution is also highly desirable because of field-of-view restrictions that may arise when employing existing RWR antenna installations. But no such single antenna DOA solution is currently available.

There is a single antenna AOA measurement technique. Shaw and Pequinot, U.S. Pat. No. 5,241,313 "Angle of Arrival Measurement via Time Doppler Shift", describe a method for using the observer's motion to measure signal angle-of-arrival. This approach uses pulse time-of-arrival (TOA) measurements, and may require more measurement time than a method using RF carrier frequency. The method has other operational drawbacks, aside from the fundamental failing of not satisfying the important DOA based ESM system requirements, since it generates only angle-of-arrival. These operational drawbacks are: the observer is restricted to fly at a constant speed during the time signal measurements needed to generate a single AOA are being made; during this measurement time the emitter must be stationary, (hence the approach does not work for the important class of airborne emitters); and finally, the technique will not work at all against CW emitters.

Therefore, an object of the invention is to provide means for producing both emitter azimuth and elevation, i.e. DOA, utilizing measurements made with a single antenna and receiver, for CW or pulsed radars, by employing the same observer motion.

A further objective of this invention is to provide a capability for making the foregoing DOA measurement to an emitter that may be moving.

Another object of the invention is to provide for measuring the DOA to the possibly moving emitter with observer "jinking maneuvers", where both the observer speed and relative speed on each dogleg may be different.

Yet another object of this invention is to provide a technique for making Doppler measurements in a way that requires the minimum number of dogleg maneuvers possible.

Still another object of this invention is to provide for measuring AOA to a possibly moving emitter with no observer "jinking maneuvers", but with observer speed changes made while flying a constant heading.

SUMMARY OF INVENTION

The foregoing objects are achieved by apparatus for obtaining DOA for both pulsed and CW moving or stationary emitters using a single antenna. As will be clear, it can also generate AOA; and whether measuring DOA or AOA, it does so without limiting operational restrictions. In particular, the invention does not require the pilot to fly the same speed throughout the measurement interval, and hence renders the observer less vulnerable to being accurately tracked by radar.

The invention accomplishes the above objectives by measuring frequency ratios. The manner in which these ratios are used is first discussed for measuring DOA, which requires observer heading changes. If the RF carrier frequency $f_{rf}$ is used, as is necessarily the case for CW emitters, but is also most desirable, because of the measurement accuracy attainable in a short receiver dwell, for any emitter having frequency coherence, the measurement ratios are formed from the frequencies measured on the $j^{th}$ and $(j+1)^{th}$ doglegs, the basic quantity measured being, for $j=0,1$, $$c_j = c\left(\frac{f_{rf_{j+1}}}{f_{rf_j}} - 1\right) \quad (2)$$

where c appearing on the right hand side is the free space speed of light. The velocity differences on the pair of doglegs corresponding to the above frequency measurements, i.e.

$$\Delta \vec{v}_j = \vec{v}_{j+1} - \vec{v}_j \quad (3)$$

are used to form a basis set ($\vec{\beta}_i$, $i=1,2,3$) such that the DOA unit vector is measured by $$\vec{u} = c_1\vec{\beta}_1 + c_2\vec{\beta}_2 + \left(1 - [c_1\ c_2]\begin{bmatrix}\vec{\beta}_1 \cdot \vec{\beta}_1 & \vec{\beta}_1 \cdot \vec{\beta}_2 \\ \vec{\beta}_1 \cdot \vec{\beta}_2 & \vec{\beta}_2 \cdot \vec{\beta}_2\end{bmatrix}\begin{bmatrix}c_1 \\ c_2\end{bmatrix}\right)^{\frac{1}{2}} \vec{\beta}_3 \quad (4)$$

The coordinate basis vector set $\vec{\beta}_i$ is generated from the velocity difference vectors by $$\vec{\beta}_1 = \frac{\Delta\vec{v}_2 \times (\Delta\vec{v}_1 \times \Delta\vec{v}_2)}{|\Delta\vec{v}_1 \times \Delta\vec{v}_2|} \quad (5)$$

$$\vec{\beta}_2 = \frac{(\Delta\vec{v}_1 \times \Delta\vec{v}_2) \times \Delta\vec{v}_1}{|\Delta\vec{v}_1 \times \Delta\vec{v}_2|}$$

$$\vec{\beta}_3 = \frac{\Delta\vec{v}_1 \times \Delta\vec{v}_2}{|\Delta\vec{v}_1 \times \Delta\vec{v}_2|}$$

The $\vec{\beta}_i$ can be resolved in NED coordinates, in which case the right hand side of Equation 6 is generated, $$\vec{u} = \cos(az)\cos(el)\vec{i} + \sin(az)\cos(el)\vec{j} + \sin(el)\vec{k} \quad (6)$$

and, in that form, the azimuth and elevation ultimately measured by $$az = \arctan\frac{u(2)}{u(1)} \quad (7)$$

$$el = \arcsin(u(3))$$

or some other suitable combination of the NED ($\vec{i},\vec{j},\vec{k}$) coefficients in Equation 6.

From the method of measuring $\vec{u}$ in Equation 4 it is clear that only three observer heading changes are required to completely define DOA, and that the observer speed can be different on each dogleg. It is also a key aspect of this method that constant velocity emitter motion does not, to an excellent approximation, affect the computation of coefficients $c_j$ defined in Equation 2.

This can be seen as follows. When measuring stationary emitter signal Doppler change (FIG. 2a), the only change in velocity 203 causing the change in the Doppler shift 201 is the observer's varying speed or heading. But for a moving emitter (FIG. 2b) the velocity 208 appearing in the Doppler equation 207 is the relative velocity arising from the addition of both the observer 209 and emitter 204 velocity vectors (203 and 205 respectively, as indicated in 210). This resulting vector 208 is not known, since the emitter's speed and heading are generally not known.

To summarize: the relative velocity $\vec{v}hd\ r$ given by the vector sum of the observer $\vec{v}_o$ and emitter $\vec{v}_e$ velocities, i.e.

$$\vec{v}_r = \vec{v}_e + \vec{v}_o$$

is what appears in the Doppler frequency shift equation $$f = f_{rest}\left(1 - \frac{\vec{v}_r}{c} \cdot \vec{u}\right)^{(-1)} \quad (8)$$

In this equation $f$ is the frequency measured at the observer and $f_{rest}$ the frequency measured at the emitter. Hence the coefficients $c_j$ are related to the relative velocity by $$c\left(\frac{f_{j+1}}{f_j} - 1\right) = (\vec{v}_{r_{j+1}} - \vec{v}_{r_j}) \cdot \vec{u} + o(c^{-1}) \quad (9)$$

$$= ((\vec{v}_{o_{j+1}} + \vec{v}_e) - (\vec{v}_{o_j} + \vec{v}_e)) \cdot \vec{u} + o(c^{-1})$$

$$= (\vec{v}_{o_{j+1}} - \vec{v}_{o_j}) \cdot \vec{u} + o(c^{-1})$$

$$= \Delta\vec{v}_j \cdot \vec{u} + o(c^{-1})$$

Thus the unknown emitter velocity 205 cancels and Equation 8 can be solved for $\vec{u}$ by Equation 4 and Equation 5 even though the emitter is flying a constant velocity track during the measurement process.

In Equation 2 the frequency has been represented as coming from RF carrier frequency measurements. However, it could also be obtained from pulse TOA measurements. If pulse TOA measurements are used, a pulse deinterleaver extracts the fundamental pulse repetition interval time interval $t_p$. This fundamental pulse repetition time interval is the greatest common divisor of the time intervals between all the pulses. The integer multiples of $t_p$ are called pulse repetition intervals or PRI. The fundamental pulse repetition frequency $f_{prf} = 1/t_p$ is then used to generate the coefficients $c_j$. Thus there is no intrinsic operational difference, from the users point of view, in the generation of the measurement represented by Equation 4 for CW or pulsed echo radars.

The manner in which the basis set $\vec{\beta}_i$ and coefficients $C_j$ are generated, and hence the right hand side of Equation 4 (or equivalently Equation 6) measured, will be clearer from the following detailed description.

DETAILED DESCRIPTION OF THE PREFERRED EMBODIMENTS

Figure 1A:
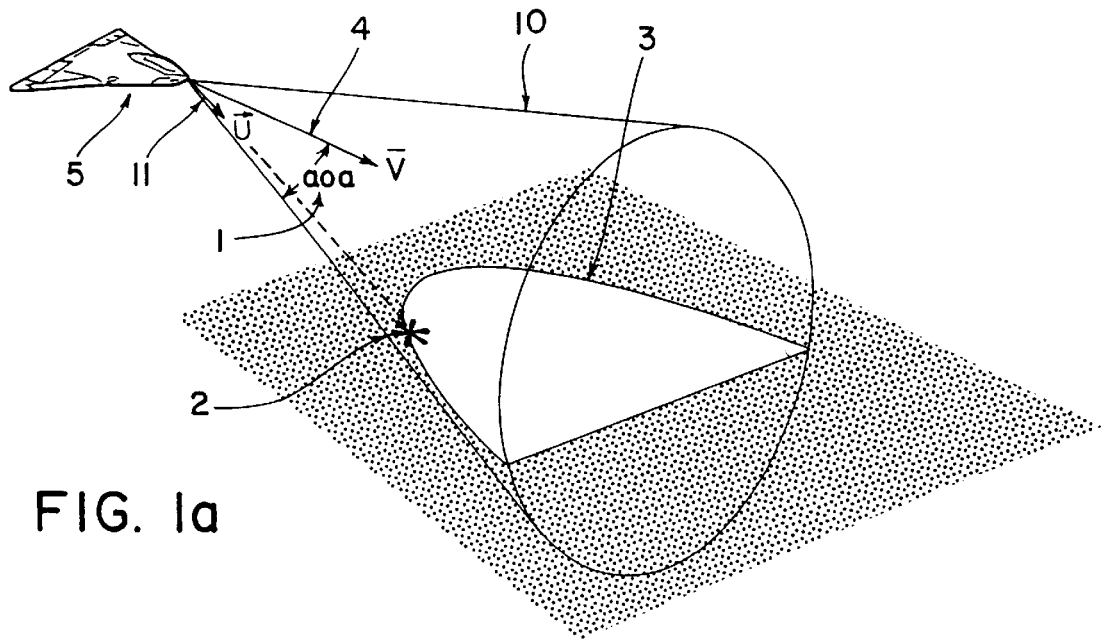
FIG. 1a is a vector diagram illustrating the uncertainty in emitter angular location that occurs when just signal angle-of-arrival is measured.
Figure 1B:
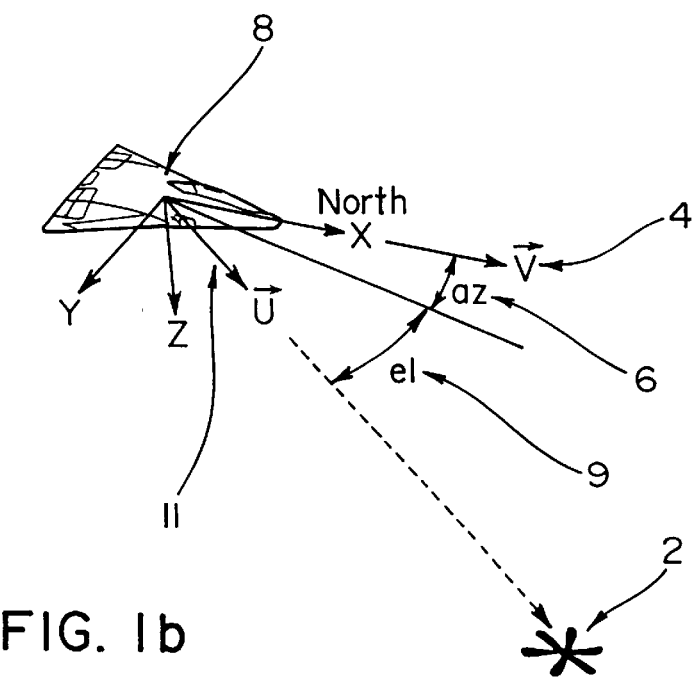
FIG. 1b is a vector diagram showing how, in contrast to AOA measurement, the signal direction-of-arrival unit vector determines the unique emitter position in angle.
Figure 2A:
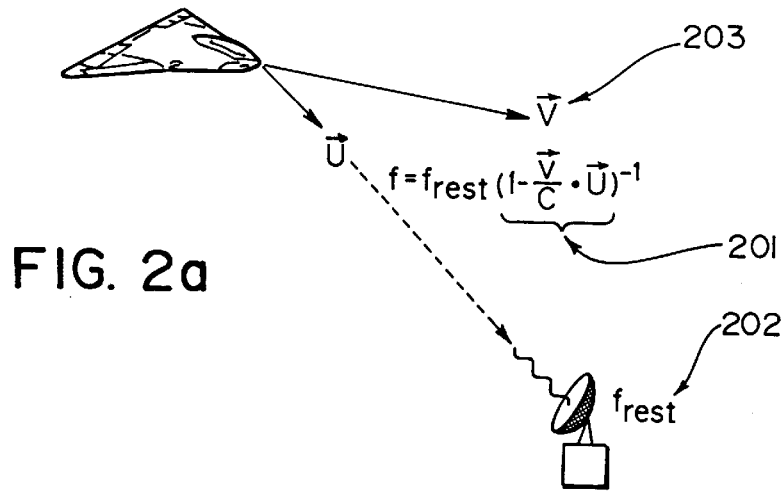
FIG. 2a is a vector diagram showing the relation between the Doppler shift coefficient and observer velocity.
Figure 2B:
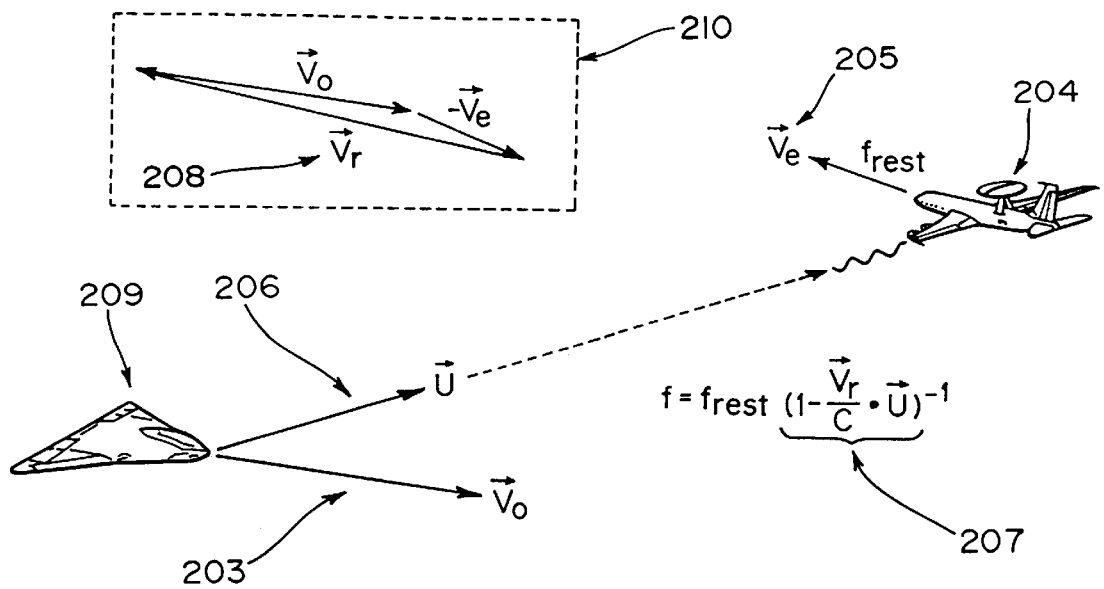
FIG. 2b is a vector diagram illustrating the relationship of velocity to the Doppler shift coefficient for moving emitters.
Figure 3:
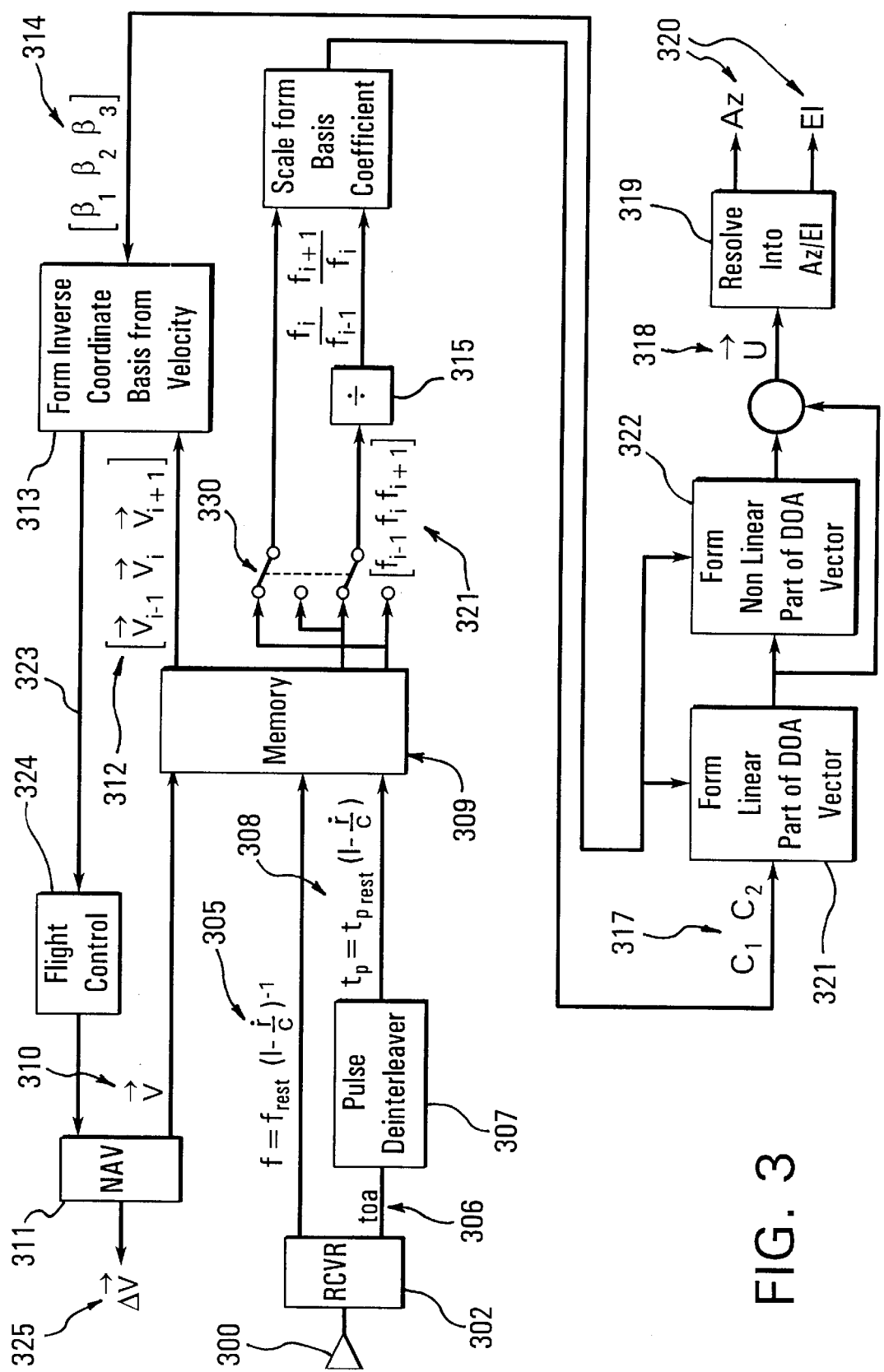
FIG. 3 is a block-schematic diagram of a preferred embodiment of the invention.

Referring to FIG. 3, a single receiver 302 and antenna 300 are used to measure carrier frequency 305 or pulse time-of-arrival 306. The receiver is assumed to have the performance of the Litton Industries Applied Technology Division's Advanced Digital Receiver, that is a frequency measurement accuracy of 5 Hz and TOA resolution of 2.5 nsec. The received pulses are deinterleaved 307 and the largest common divisor of the PARI intervals, $t_p$ 308, extracted using a deinterleaver that has the capabilities of the Litton Industries Amecom Division's Advanced ADVCAP deinterleaver developed for the AN/ALQ-99 jamming system. These operations of frequency measurement or $t_p$ (equivalently $f_{prf}$) extraction all occur during a single dwell, and the results for the dwell are stored in memory 309. The observer velocity 310 is also sampled from the navigation system 311 output during the dwell, and the sampled velocity stored in memory 309. The frequency or TOA and velocity measurements are repeated for three contiguous dwells, with heading, and possibly speed or altitude changes occurring between the dwells. The resulting three velocities are used to generate in processor 313 the DOA unit vector basis set 314. The $f_{rf}$ or $f_{prf}$ frequency ratios are measured in divider 315 and basis set coefficients 317 of the basis set 314 generated. Frequency measurements to generate the coefficients 317 are derived either from frequency measurements 305 or pulse TOA measurements 306. Feedback 323 to control the change in observer velocity aids in generating the best basis set 314 for the DOA measurement. After the unit vector 318 is formed, the basis vectors 314 can be resolved in the appropriate system coordinates 319 and azimuth and elevation angles 320 found for those coordinates.

An important aspect of this invention is the measurement of the unit DOA vector 318 utilizing both a linear part formed in processor 321 and nonlinear part generated by processor 322. The nonlinear part measures the coefficient of $\vec{\beta}_3$ in Equation 4. This coefficient arises from the normalization constraint $$\vec{u} \cdot \vec{u} = 1$$

for the DOA unit vector. Utilizing this constraint reduces the number of independent velocity vectors and hence also receiver dwells needed by one. If four independent velocity measurements and corresponding $f_{rf}$ or $f_{prf}$ measurements are available process 322 is not used.

After the first velocity is measured, feedback 323 of this velocity to a flight controller 324 can provide the velocity change desired to ultimately provide the best basis set 314. This velocity change 325 may be an actual command signal in an unmanned remotely piloted vehicle, or a suggested new speed and heading displayed in a fighter type manned aircraft.

Mixed mode operation can also be performed in generating the coefficients 317. That is the switch 330 can be set to utilize carrier frequency to generate one coefficient or set of coefficients and PRF to generate the other. Such operation is useful in detecting radar ECCM directed against signal Doppler exploitation.

FIG. 4 shows simulated performance. The observer flew at 480 knots on an initial heading of 45° at 10000 feet. The heading changes between dwells were generated randomly from a Gaussian distribution with a mean 0° and one sigma of 5°. Changes in observer altitude were also generated with 0 foot per minute (fpm) mean and one sigma of 1000 fpm. Speed changes were −80 knots on climbs and +30 knots during descents.

Figure 4A:
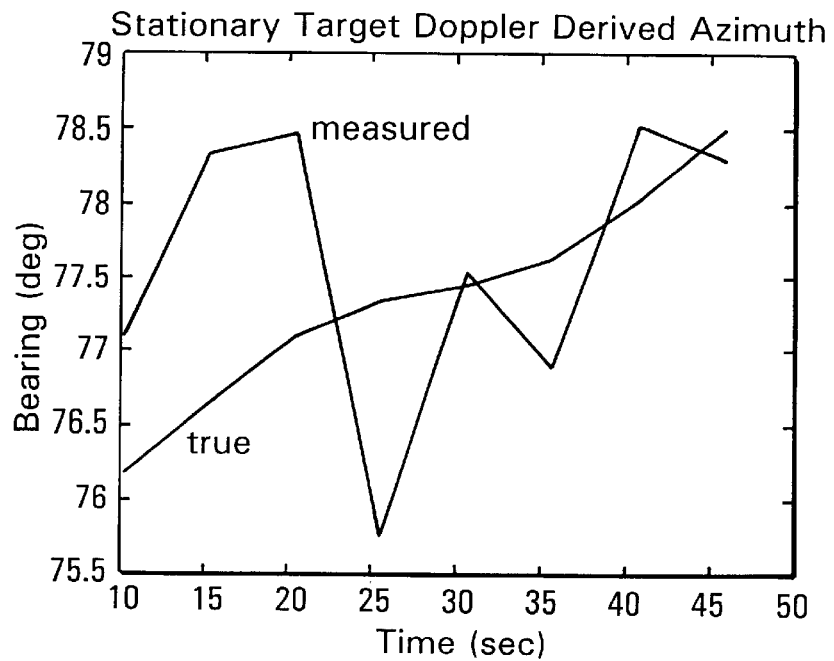
FIGS. 4a and FIG. 4b are, respectively, bearing and elevation vs. time diagrams showing simulated performance of the invention against a stationary emitter using pulse TOA measurements.
Figure 4B:
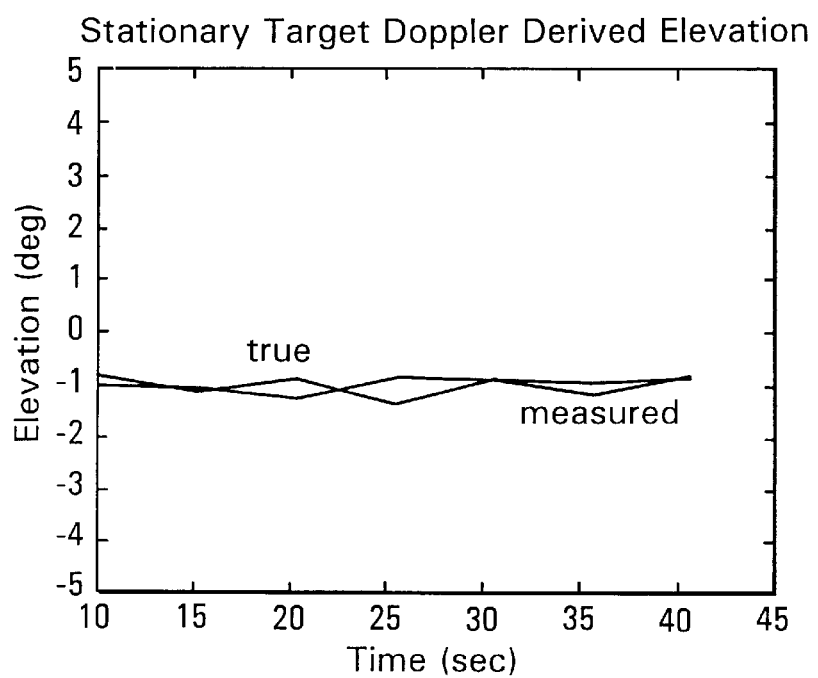

FIG. 4a and FIG. 4b gives stationary emitter performance. The 2 GHz emitter was at 60 nautical miles (nmi) with an initial relative bearing of 30°, and true azimuth and elevation as shown in the Figures. FIG. 4a compares measured azimuth, generated by a simulation of the system shown in FIG. 3, with the true azimuth. FIG. 4b compares true and measured elevation. Pulse TOA was measured to produce these results with an assumed PARI of 500 $\mu$secs.

Figure 4C:
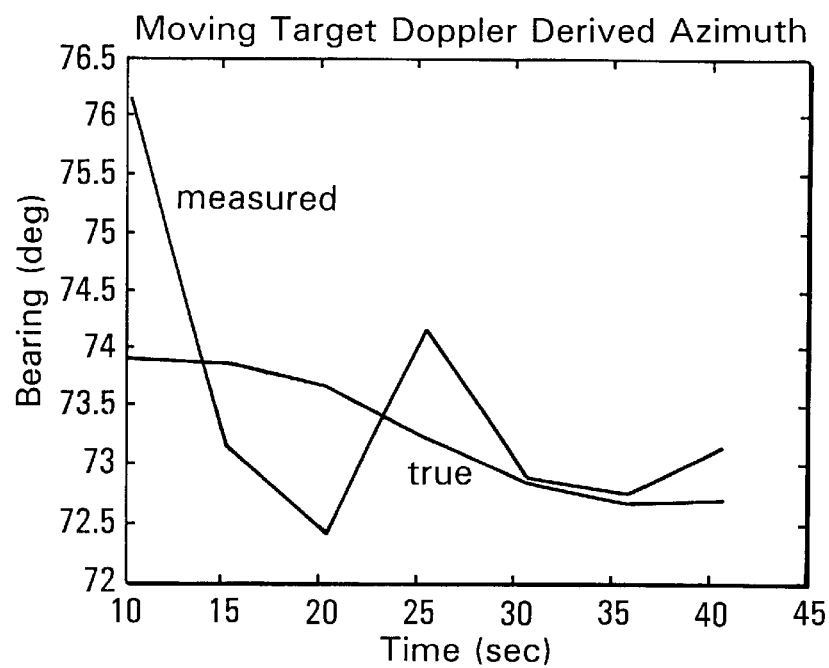
FIGS. 4c and FIG. 4d are, respectively, bearing and elevation vs. time diagrams showing the invention's simulated performance against a moving emitter using frequency measurements.
Figure 4D:
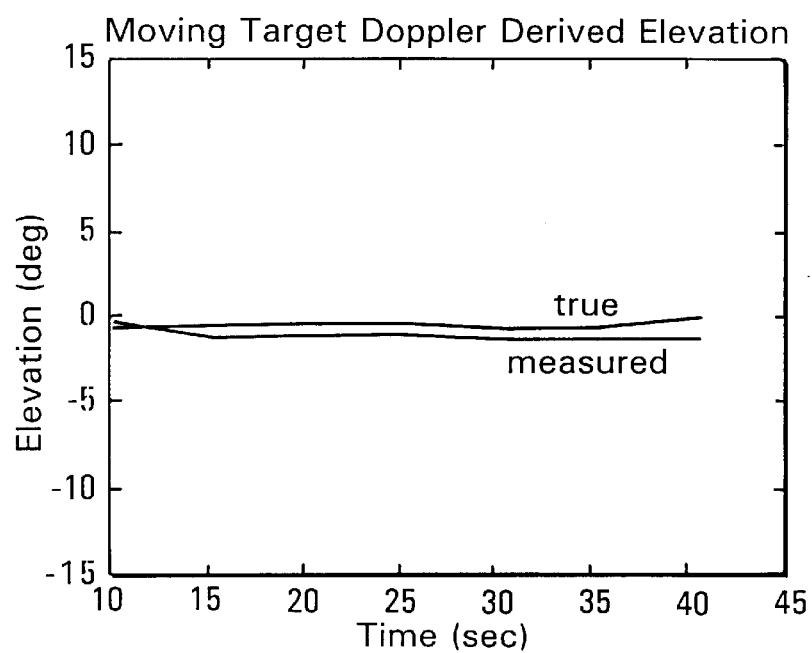

For the performance shown in FIG. 4c and 4d RF carrier frequency was measured, and the emitter was flying a constant velocity track with speed 370 knots, heading 315° and altitude 10000 feet. In both stationary emitter and moving emitter cases signal SNR was 13 dB.

The performance shown in FIG. 4c and 4d confirms the argument given with Equation 9: target constant velocity motion during the measurement interval has no effect on DOA measurement using the method and apparatus of this invention. This constant velocity motion does not represent an unrealistic restriction on the emitter, since it is required only for the short time over which DOA is generated.

I claim:

1. Apparatus for measuring, from a moving observer, direction of arrival (DOA), including azimuth and elevation, of a continuous wave radar signal from a moving emitter using Doppler shift, comprising:

an antenna for sensing the emitter radar signal, receiver means for measuring emitter carrier frequency over a predetermined dwell period, navigation signal means for measuring observer velocity, i.e., speed and heading during a dwell and providing corresponding output signals, observer control means for changing observer heading, speed or both between dwells or observer altitude during a dwell for establishing at least two linearally independent velocity vector differences, memory means for receiving outputs from said receiver means and said navigation signal means for storing three contiguous velocities measured during three contiguous dwells and the respective three measured emitter carrier frequencies, first computation means for taking the difference of the velocities and forming inverse coordinate basis vectors corresponding to these two unique velocity differences, first processor means for forming corresponding ratios of the carrier frequency measurements and forming basis set coefficients for two of said basis vectors, second processor means for deriving a normalizing coefficient for a third inverse coordinate basis vector so that the DOA unit vector is measured by equation 4 and second computation means for resolving the DOA unit vector in the system coordinates in which the emitter azimuth and elevation angles are defined and to compute the azimuth and elevation angle from the coefficients of the unit vector in those coordinates.

2. The apparatus defined in claim 1 wherein said DOA measurement is made using a pulsed repetition interval Doppler shift, wherein said receiver means measures the emitter radar pulse times of arrival (TOA) over a predetermined dwell period, comprising additionally:

a pulse deinterleaver to derive the fundamental time period ($t_p$) between pulses in a frame determined by the TOA measurements during said predetermined dwell, said memory means storing three contiguous $t_p$ measurements corresponding with said three contiguous velocities measured during said three contiguous dwells.

said first processor means forming corresponding ratios of the pulse repetition frequency measurements and forming coefficients for two of said inverse coordinate basis vectors.

3. The apparatus described in claim 1 wherein said predetermined dwell period is in a range of from 10 milliseconds to 5 seconds.

4. The apparatus defined in claim 1 wherein signal angle of arrival (AOA) is determined to a possibly moving emitter by an observer flying a constant heading, but two different speeds for two different dwells wherein:

said first processor means forms said basis coefficients which are related to said two speeds and from which the AOA can be determined.

* * * * *